United States Patent
Otsu et al.

(10) Patent No.: US 8,827,771 B2
(45) Date of Patent: Sep. 9, 2014

(54) POLISHING COMPOSITION AND POLISHING METHOD USING THE SAME

(75) Inventors: Taira Otsu, Ichinomiya (JP); Keigo Ohashi, Gifu (JP)

(73) Assignee: Fujimi Incorporated, Kiyosu-shi (JP)

(*) Notice: Subject to any disclaimer, the term of this patent is extended or adjusted under 35 U.S.C. 154(b) by 820 days.

(21) Appl. No.: 12/999,475

(22) PCT Filed: Jun. 15, 2009

(86) PCT No.: PCT/JP2009/060848
§ 371 (c)(1),
(2), (4) Date: Feb. 24, 2011

(87) PCT Pub. No.: WO2009/154164
PCT Pub. Date: Dec. 23, 2009

(65) Prior Publication Data
US 2011/0183581 A1    Jul. 28, 2011

(30) Foreign Application Priority Data

Jun. 18, 2008 (JP) ................................ 2008-159192

(51) Int. Cl.
*B24B 7/22* (2006.01)

(52) U.S. Cl.
USPC .............................................. 451/41; 451/37

(58) Field of Classification Search
USPC ........................... 451/37, 36, 41; 51/307, 298
See application file for complete search history.

(56) References Cited

U.S. PATENT DOCUMENTS

| | | | |
|---|---|---|---|
| 7,097,541 B2 * | 8/2006 | DeRege Thesauro et al. | 451/36 |
| 2002/0098697 A1 | 7/2002 | Shimazu et al. | |
| 2004/0152309 A1 | 8/2004 | Carter et al. | |
| 2004/0241379 A1 | 12/2004 | Horie et al. | |
| 2005/0248882 A1 | 11/2005 | Horie et al. | |
| 2006/0030158 A1 | 2/2006 | Carter et al. | |
| 2006/0086055 A1 | 4/2006 | Carter | |
| 2007/0044386 A1 | 3/2007 | Yamaguchi | |
| 2008/0104893 A1 | 5/2008 | Oh | |
| 2009/0042485 A1 | 2/2009 | Yamaguchi | |

FOREIGN PATENT DOCUMENTS

| | | |
|---|---|---|
| CN | 101177603 A | 5/2008 |
| EP | 1 369 906 A1 | 12/2003 |
| EP | 1918340 A2 | 5/2008 |
| JP | 2000-109818 | 4/2000 |
| JP | 2000-315667 | 11/2000 |
| JP | 2001 35820 A | 8/2002 |
| JP | 2003 347248 | 12/2003 |
| JP | 2004 162062 | 6/2004 |
| JP | 2004-259417 A | 9/2004 |
| JP | 2007 273641 A | 10/2004 |
| JP | 2006-007399 | 1/2006 |
| JP | 2006 140361 A | 6/2006 |
| JP | 2006-167817 | 6/2006 |
| JP | 2006-193695 | 7/2006 |
| JP | 2007-213020 | 8/2007 |
| JP | 2008-091411 | 4/2008 |
| JP | 2008-091524 | 4/2008 |
| JP | 2008-117807 | 5/2008 |
| KR | 2004 0055042 | 6/2004 |
| WO | 01/04231 A1 | 1/2001 |
| WO | 2004/076574 A2 | 9/2004 |
| WO | 2006/059627 A1 | 6/2006 |
| WO | 2006/078074 A2 | 7/2006 |
| WO | 2007/038077 A2 | 4/2007 |

OTHER PUBLICATIONS

JP language International Preliminary Report, showing the correct reference of CN101177603 English translation displays an incorrect No. of CN101177609.
Japanese Office Action, dated Apr. 24, 2014.

* cited by examiner

*Primary Examiner* — Robert Rose
(74) *Attorney, Agent, or Firm* — Vidas, Arrett & Steinkraus

(57) ABSTRACT

There is provided a polishing composition, containing abrasive grains and an acid represented either by $R^2-R^1-SO_3H$ (wherein $R^1$ is a linear alkylene or hydroxyalkylene group having 1 to 4 carbon atoms, and $R^2$ is a hydroxy group, a carboxy group, or a sulfonic acid group when $R^1$ is the linear alkylene group, or $R^2$ is a carboxy group or a hydroxymethyl group when $R^1$ is the linear hydroxyalkylene group), or by $C_6H_5-R^3$ (wherein $R^3$ is a sulfonic acid group or a phosphonic acid group). The acid contained in the polishing composition is preferably isethionic acid or benzenesulfonic acid. The polishing composition is mainly used in the application of polishing silicon oxide materials including glass substrates for hard disks, synthetic quartz substrates for photomasks, and low-dielectric-constant films such as silicon dioxide films, BPSG films, PSG films, FSG films, and organosiloxane films of semiconductor devices.

7 Claims, No Drawings

POLISHING COMPOSITION AND POLISHING METHOD USING THE SAME

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a polishing composition mainly used in the application of polishing silicon oxide materials, more specifically in the application of polishing glass substrates for hard disks, synthetic quartz substrates for photomasks, or low-dielectric-constant films such as silicon dioxide films, borophosphosilicate glass (BPSG) films, phosphosilicate glass (PSG) films, fluorosilicate glass (FSG) films, and organosiloxane films of semiconductor devices. The present invention also relates to a polishing method using the above composition.

To improve the quality of silicon oxide materials after polishing, polishing compositions used in the application of polishing silicon oxide materials are strongly required to reduce, by polishing, the surface roughness and the number of surface defects such as scratches on silicon oxide materials. Furthermore, in order to decrease the time required for the polishing work, the polishing composition is also required to provide a high polishing rate (removal rate) of the silicon oxide materials.

As a polishing composition that can be used in the application of polishing silicon oxide materials, polishing compositions described, for example, in Patent Documents 1 to 4 are conventionally known. The polishing composition of Patent Document 1 contains abrasive grains such as colloidal silica and a polymer having a sulfonic group such as an acrylic acid/sulfonic acid copolymer. The polishing composition of Patent Document 2 contains abrasive grains such as colloidal silica and a zeta potential regulator comprising an acid, a base, a salt, or a surfactant for regulating the zeta potential of the abrasive grains in the range of −15 to 40 mV. The polishing composition of Patent Document 3 contains colloidal silica having an average primary particle size of 60 nm or less and has a pH adjusted in the range of 0.5 to 4. The polishing composition of Patent Document 4 contains colloidal silica having a degree of association of more than 1 and an acid and has a pH adjusted in the range of 1 to 4. However, these conventional polishing compositions are unsatisfactory for sufficiently satisfying all the above-described requirements and still have room for improvement.

PRIOR ART DOCUMENTS

Patent Document 1: Japanese Laid-Open Patent Publication No. 2006-167817
Patent Document 2: Japanese Laid-Open Patent Publication No. 2006-7399
Patent Document 3: Japanese Laid-Open Patent Publication No. 2007-213020
Patent Document 4: Japanese Laid-Open Patent Publication No. 2008-117807

BRIEF SUMMARY OF THE INVENTION

Problems that the Invention is to Solve

Accordingly, an objective of the present invention is to provide a polishing composition that can be more suitably used in the application of polishing silicon oxide materials, and to provide a polishing method using the same.

Means for Solving the Problems

In order to achieve the above objective, and in accordance with one aspect of the present invention, there is provided a polishing composition, containing abrasive grains and an acid represented either by the general formula (1):

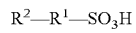

where $R^1$ is a linear alkylene or hydroxyalkylene group having 1 to 4 carbon atoms, and $R^2$ is a hydroxy group, a carboxy group, or a sulfonic acid group when $R^1$ is the linear alkylene group, or $R^2$ is a carboxy group or a hydroxymethyl group when $R^1$ is the linear hydroxyalkylene group,
or by the general formula (2):

where $R^3$ is a sulfonic acid group or a phosphonic acid group.

The acid contained in the polishing composition is preferably isethionic acid or benzenesulfonic acid. The polishing composition may further contain a water-soluble polymer.

In accordance with another aspect of the present invention, there is provided a polishing method for polishing a silicon oxide material using the above polishing composition.

Effects of the Invention

The present invention provides a polishing composition that can be more suitably used in the application of polishing silicon oxide materials, and provides a polishing method using the same.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated Hereinafter, one embodiment of the present invention will be described.

A polishing composition of the present embodiment is produced by mixing a specific acid and abrasive grains with water. Accordingly, the polishing composition contains a specific acid, abrasive grains, and water. The polishing composition of the present embodiment is mainly used in the application of polishing silicon oxide materials including glass substrates for hard disks, synthetic quartz substrates for photomasks, and low-dielectric-constant films such as silicon dioxide films, BPSG films, PSG films, FSG films, and organosiloxane films of semiconductor devices.

The specific acid contained in the polishing composition is an acid represented by the general formula (1): $R^2$—$R^1$—$SO_3H$. In the general formula (1), $R^1$ is a linear alkylene or hydroxyalkylene group having 1 to 4 carbon atoms, preferably 2 or 3 carbon atoms, and most preferably 2 carbon atoms; and $R^2$ is a hydroxy group (—OH), a carboxy group (—COOH), or a sulfonic acid group (—$SO_3H$) when $R^1$ is the linear alkylene group, or $R^2$ is a carboxy group or a hydroxymethyl group (—CH$_2$OH) when $R^1$ is the linear hydroxyalkylene group. Here, the linear alkylene group having 1 to 4 carbon atoms is specifically a methylene group (—CH$_2$—), an ethylene group (—CH$_2$CH$_2$—), a propylene group (—CH$_2$CH$_2$CH$_2$—), or a butylene group (—CH$_2$CH$_2$CH$_2$CH$_2$—); and the linear hydroxyalkylene group having 1 to 4 carbon atoms is a group in which one of the hydrogen atoms in a linear alkylene group having 1 to 4 carbon atoms is replaced by a hydroxy group. Specific examples of the acid represented by the general formula (1) include isethionic acid (HOCH$_2$CH$_2$SO$_3$H), sulfopropionic acid (HOOCCH$_2$CH$_2$SO$_3$H), sulfopropanediol (HOCH$_2$CH(OH)CH$_2$SO$_3$H), and ethionic acid (HO$_3$SCH$_2$CH$_2$SO$_3$H).

Alternatively, the specific acid contained in the polishing composition is an acid represented by the general formula (2): $C_6H_5$—$R^3$. In the general formula (2), $R^3$ is a sulfonic acid group (—SO$_3$H) or a phosphonic acid group (—PO$_3$H$_2$). That is, the acid represented by the general formula (2) is benzenesulfonic acid ($C_6H_5SO_3H$) or benzenephosphonic acid ($C_6H_5PO_3H_2$).

Addition of the acid represented by the general formula (1) or (2) to the polishing composition allows the polishing rate of a silicon oxide material with the polishing composition to be greatly increased without much increasing the surface roughness and the number of scratches of the silicon oxide material after polishing with the polishing composition. It is inferred that the increase in the polishing rate by the addition of the acid does not occur through the corrosion of the silicon oxide material with the acid, but occurs through appropriate relief of the repulsion between the abrasive grains and the silicon oxide material and through the occurrence of appropriate aggregation of the abrasive grains, by the action of the acid.

Among the acids represented by the general formula (1), the acid represented by the general formula (1), where $R^1$ is a linear alkylene group having 2 carbon atoms, and $R^2$ is a hydroxy group, that is, isethionic acid, can be particularly suitably used as the acid contained in the polishing composition because it has only a small effect in increasing the surface roughness of the silicon oxide material after polishing with the polishing composition. Furthermore, among the acids represented by the general formula (2), the acid represented by the general formula (2), where $R^3$ is a sulfonic acid group, that is, benzenesulfonic acid, can be particularly suitably used as the acid contained in the polishing composition because it also has only a small effect in increasing the surface roughness of the silicon oxide material after polishing with the polishing composition.

The content of the acid represented by the general formula (1) or (2) in the polishing composition is preferably 0.001 mol/L or more, more preferably 0.01 mol/L or more, and particularly preferably 0.015 mol/L or more. The polishing rate of the silicon oxide material with the polishing composition tends to be increased as the content of the acid increases. In this regard, when the content of the acid represented by the general formula (1) or (2) in the polishing composition is 0.001 mol/L or more, more specifically 0.01 mol/L or more, or 0.015 mol/L or more, it will be easier to increase the polishing rate of the silicon oxide material with the polishing composition to a particularly suitable level for practical use.

Furthermore, the content of the acid represented by the general formula (1) or (2) in the polishing composition is preferably 3 mol/L or less, more preferably 1 mol/L or less, and particularly preferably 0.5 mol/L or less. The surface roughness of the silicon oxide material after polishing with the polishing composition is reduced as the content of the acid decreases. In this regard, when the content of the acid represented by the general formula (1) or (2) in the polishing composition is 3 mol/L or less, more specifically 1 mol/L or less, or 0.5 mol/L or less, it will be easier to decrease the surface roughness of the silicon oxide material after polishing with the polishing composition to a particularly suitable level for practical use.

The type of the abrasive grains contained in the polishing composition is not particularly limited, and examples of the abrasive grains that can be used include particles of oxides such as silicon oxide, aluminum oxide, titanium oxide, zirconium oxide, and cerium oxide, and resin particles. However, when the polishing composition is used in the application of polishing silicon oxide materials, silicon dioxide such as colloidal silica and fumed silica, especially colloidal silica, can be suitably used. When silicon dioxide, especially colloidal silica, is used as abrasive grains, the number of scratches on the silicon oxide material after polishing with the polishing composition is significantly reduced.

The abrasive grains contained in the polishing composition have an average particle size (average primary particle size) calculated from the BET specific surface area, and the average particle size is preferably 1 nm or more, more preferably 5 nm or more, further preferably 10 nm or more, and particularly preferably 13 nm or more. The polishing rate of the silicon oxide material with the polishing composition is increased as the average primary particle size increases. In this regard, when the abrasive grains have an average primary particle size of 1 nm or more, more specifically 5 nm or more, 10 nm or more, or 13 nm or more, it will be easier to increase the polishing rate of the silicon oxide material with the polishing composition to a particularly suitable level for practical use.

Furthermore, the abrasive grains contained in the polishing composition preferably have an average primary particle size of 80 nm or less, more preferably 40 nm or less, further preferably 30 nm or less, and particularly preferably 27 nm or less. The surface roughness of the silicon oxide material after polishing with the polishing composition is reduced as the average primary particle size decreases. In this regard, when the abrasive grains have an average primary particle size of 80 nm or less, more specifically 40 nm or less, 30 nm or less, or 27 nm or less, it will be easier to improve the surface roughness of the silicon oxide material after polishing with the polishing composition to a particularly suitable level for practical use.

The abrasive grains contained in the polishing composition have an average particle size (average secondary particle size) determined by a dynamic scattering method, and the average particle size is preferably 5 nm or more, more preferably 10 nm or more, and further preferably 15 nm or more. The polishing rate of the silicon oxide material with the polishing composition is increased as the average secondary particle size increases. In this regard, when the abrasive grains have an average secondary particle size of 5 nm or more, more specifically 10 nm or more, or 15 nm or more, it will be easier to increase the polishing rate of the silicon oxide material with the polishing composition to a particularly suitable level for practical use.

Furthermore, the abrasive grains contained in the polishing composition preferably have an average secondary particle size of 200 nm or less, more preferably 150 nm or less, further preferably 100 nm or less, and particularly preferably 60 nm or less. The surface roughness of the silicon oxide material after polishing with the polishing composition is reduced as the average secondary particle size decreases. In this regard, when the abrasive grains have an average secondary particle size of 200 nm or less, more specifically 150 nm or less, 100 nm or less, or 60 nm or less, it will be easier to improve the surface roughness of the silicon oxide material after polishing with the polishing composition to a particularly suitable level for practical use.

A value obtained by dividing the average secondary particle size of the abrasive grains contained in the polishing composition by the average primary particle size thereof is preferably 3 or less, more preferably 2.5 or less, and particularly preferably 2 or less. As the value decreases, the surface roughness and the number of scratches of the silicon oxide material after polishing with the polishing composition are reduced. In this regard, when the average secondary particle size of the abrasive grains divided by the average primary particle size thereof is 3 or less, more specifically 2.5 or less, or 2 or less, it will be easier to reduce the surface roughness and the number of scratches of the silicon oxide material after polishing with the polishing composition to a particularly suitable level for practical use.

The content of the abrasive grains in the polishing composition is preferably 0.1% by mass or more, more preferably 1% by mass or more, and further preferably 3% by mass or more. The polishing rate of the silicon oxide material with the polishing composition is increased as the content of the abrasive grains increases. In this regard, when the content of the abrasive grains in the polishing composition is 0.1% by mass or more, more specifically 1% by mass or more, or 3% by mass or more, it will be easier to increase the polishing rate of the silicon oxide material with the polishing composition to a particularly suitable level for practical use.

Furthermore, the content of the abrasive grains in the polishing composition is preferably 20% by mass or less, more preferably 15% by mass or less, and further preferably 10% by mass or less. The slurry stability of the polishing composition is improved as the content of the abrasive grains decreases. In this regard, when the content of the abrasive grains in the polishing composition is 20% by mass or less, more specifically 15% by mass or less, or 10% by mass or less, it will be easier to improve the slurry stability of the polishing composition to a particularly suitable level for practical use.

The value of pH of the polishing composition does not particularly have an upper limit, but it is preferably 3 or less, more preferably 2.5 or less, further preferably 2 or less, and particularly preferably 1.5 or less when the composition is used in the application of polishing glass substrates for hard disks or synthetic quartz substrates for photomasks. The polishing rate of the glass substrates for hard disks and the synthetic quartz substrates for photomasks with the polishing composition is increased as the value of pH of the polishing composition decreases. In this regard, when the pH of the polishing composition is 3 or less, more specifically 2.5 or less, 2 or less, or 1.5 or less, it will be easier to increase the polishing rate of the glass substrates for hard disks and the synthetic quartz substrates for photomasks with the polishing composition to a particularly suitable level for practical use.

Furthermore, when the composition is used in the application of polishing glass substrates for hard disks or synthetic quartz substrates for photomasks, the value of pH of the polishing composition does not particularly have a lower limit, but it is preferably 0.5 or more, and more preferably 1 or more in order to reduce the damage of the polishing pad.

An acid or an alkali may be separately added to the polishing composition in order to adjust the pH of the polishing composition to a desired value. Any acid or alkali may be used.

According to the present embodiment, the following advantages are obtained.

Since the polishing composition of the present embodiment contains an acid represented by the general formula (1) or (2) and abrasive grains, it can polish silicon oxide materials at a high removal rate while well reducing the surface roughness and the number of scratches of the silicon oxide materials after polishing. Accordingly, the polishing composition of the present embodiment can be suitably used in the application of polishing silicon oxide materials.

The above embodiment may be modified as follows.

The polishing composition of the above embodiment may further contain a water-soluble polymer. When a water-soluble polymer is further contained, the surface roughness of the silicon oxide material after polishing with the polishing composition will be further reduced. Examples of the water-soluble polymer that can be used include a polystyrene sulfonate, a polyacrylate, and a polyvinyl acetate, and particularly suitably used is a polystyrene sulfonate such as sodium polystyrene sulfonate. The polystyrene sulfonate preferably has a weight average molecular weight in the range of 1,000 to 5,000,000, more preferably in the range of 10,000 to 2,500,000, and particularly preferably in the range of 500,000 to 2,000,000.

The polishing composition of the above embodiment may further contain an oxidizing agent. Examples of the oxidizing agent that can be used include hydrogen peroxide, peroxides, nitrates, iodates, periodates, hypochlorites, chlorites, chlorates, perchlorates, persulfates, dichromates, permanganates, ozone water, silver (II) salts, and iron (III) salts. Particularly suitably used is hydrogen peroxide.

To the polishing composition of the above embodiment, additives such as chelating agents, surfactants, pH adjusters, preservatives, antifungal agents, and anticorrosives may be optionally added.

The polishing composition of the above embodiment may be prepared by diluting a stock solution of the polishing composition with water.

Next, the present invention will be more specifically described with reference to Examples and Comparative Examples.

Examples 1 to 15 and Comparative Examples 1 to 18

In Examples 1 to 15, an acid and colloidal silica were mixed with water, optionally along with a water-soluble polymer, to prepare a polishing composition. In Comparative Examples 1 to 18, an acid, colloidal silica, and a water-soluble polymer were mixed with water as appropriate to prepare a polishing composition. Details of the acid, the colloidal silica, and the water-soluble polymer in the polishing composition of each Example and Comparative Example, and the results of the measurement of the pH of the polishing composition of each Example and Comparative Example are shown in Tables 1 and 2.

In the column entitled "Type and concentration of acid" in Tables 1 and 2,

A1 represents isethionic acid;
A2 represents sulfopropionic acid;
A3 represents sulfopropanediol;
A4 represents benzenesulfonic acid;
A5 represents ethionic acid;
A6 represents sulfuric acid;
A7 represents nitric acid;
A8 represents hydrochloric acid;
A9 represents phosphoric acid;
A10 represents phosphonic acid;

A11 represents citric acid;
A12 represents acetic acid;
A13 represents formic acid;
A14 represents glycolic acid;
A15 represents taurine;
A16 represents methanesulfonic acid;
A17 represents ethanesulfonic acid;
A18 represents ethylene glycol;
A19 represents p-toluenesulfonic acid; and
A20 represents potassium gluconate.

In the column entitled "Type and concentration of colloidal silica" in Tables 1 and 2,
B1 represents colloidal silica having an average primary particle size of 16 nm and an average secondary particle size of 16 nm;
B2 represents colloidal silica having an average primary particle size of 23 nm and an average secondary particle size of 35 nm; and
B3 represents colloidal silica having an average primary particle size of 30 nm and an average secondary particle size of 40 nm.

In the column entitled "Type and concentration of water-soluble polymer" in Tables 1 and 2,
C1 represents sodium polystyrene sulfonate having a weight average molecular weight of 10,000;
C2 represents sodium polystyrene sulfonate having a weight average molecular weight of 500,000; and
C3 represents sodium polystyrene sulfonate having a weight average molecular weight of 1,000,000.

The surface of an aluminosilicate glass substrate for magnetic disks having a diameter of 2.5 inches (about 65 mm) was polished on the conditions shown in Table 3 using the polishing composition of each Example and Comparative Example. The polishing rate was determined based on the difference of the weight of the substrate before and after polishing. The results of the evaluation are shown in the column entitled "Polishing rate" in Tables 1 and 2 according to the criteria as follows: "5", when the value of the determined polishing rate was 0.059 μm/min or more; "4", when it was 0.046 μm/min or more and less than 0.059 μm/min; "3", when it was 0.033 μm/min or more and less than 0.046 μm/min; "2", when it was 0.020 μm/min or more and less than 0.033 μm/min; and "1", when it was less than 0.020 μm/min. The grades 4 and 5, that is, a polishing rate of 0.046 μm/min or more, are above the acceptable level.

The surface roughness Ra of the aluminosilicate glass substrate after polishing using the polishing composition of each Example and Comparative Example was measured using an atomic force microscope "Nanoscope III dimension 3000" manufactured by Digital Instruments, Inc. The results of the evaluation are shown in the column entitled "Surface roughness" in Tables 1 and 2 according to the criteria as follows: "6", when the value of the measured surface roughness Ra was less than 0.60 Å; "5", when it was 0.60 Å or more and less than 0.64 Å; "4", when it was 0.64 Å or more and less than 0.68 Å; "3", when it was 0.68 Å or more and less than 0.72 Å; "2", when it was 0.72 Å or more and less than 0.76 Å; and "1", when it was 0.76 Å or more. The grades 3 to 6, that is, a surface roughness Ra of less than 0.72 Å, are above the acceptable level.

The number of scratches on the surface of the aluminosilicate glass substrate after polishing using the polishing composition of each Example and Comparative Example was measured using a visual inspection device "MicroMax VMX2100" manufactured by Vision Psytec Co., Ltd. The results of the evaluation are shown in the column entitled "Number of scratches" in Tables 1 and 2 according to the criteria as follows: "3" when the number of scratches measured per surface was less than 10; "2", when it was 10 or more and less than 20; and "1", when it was 20 or more. The grades 2 and 3, that is, the number of scratches per surface of less than 20, are above the acceptable level.

The slurry stability of the polishing composition of each Example and Comparative Example was evaluated. The results of the evaluation are shown in the column entitled "Slurry stability" in Tables 1 and 2 according to the criteria as follows: "3", when the occurrence of aggregation or precipitation of abrasive grains was not observed after a lapse of 14 days from the start of still standing storage at ordinary temperature; "2", when it was observed on the 7th day or after and before the 14th day; and "1", when it was observed before the 7th day. The grades 2 and 3, that is, the occurrence of aggregation or precipitation of abrasive grains not having been observed before the 7th day, are above the acceptable level.

TABLE 1

|  | Type and concentration of acid | Type and concentration of colloidal silica | Type and concentration of water-soluble polymer | pH | Polishing rate | Surface roughness | Number of scratches | Slurry stability |
| --- | --- | --- | --- | --- | --- | --- | --- | --- |
| Example 1 | A1 0.12 mol/L | B1 5.9 mass % | — | 1.2 | 4 | 5 | 3 | 3 |
| Example 2 | A1 0.12 mol/L | B2 5.9 mass % | — | 1.2 | 5 | 4 | 3 | 3 |
| Example 3 | A1 0.12 mol/L | B3 5.9 mass % | — | 1.2 | 5 | 4 | 3 | 3 |
| Example 4 | A1 0.12 mol/L | B1 2.5 mass % | — | 1.0 | 4 | 4 | 2 | 3 |
| Example 5 | A1 0.12 mol/L | B1 15 mass % | — | 1.4 | 4 | 5 | 3 | 3 |
| Example 6 | A1 0.12 mol/L | B1 5.9 mass % | C1 0.02 mass % | 1.2 | 4 | 5 | 3 | 3 |
| Example 7 | A1 0.12 mol/L | B1 5.9 mass % | C2 0.02 mass % | 1.2 | 4 | 6 | 3 | 3 |
| Example 8 | A1 0.12 mol/L | B1 5.9 mass % | C3 0.02 mass % | 1.2 | 4 | 6 | 3 | 3 |
| Example 9 | A1 0.06 mol/L | B1 5.9 mass % | — | 2.0 | 4 | 5 | 3 | 3 |
| Example 10 | A1 0.5 mol/L | B1 5.9 mass % | — | 0.9 | 5 | 4 | 3 | 3 |
| Example 11 | A1 | B1 | — | 0.7 | 5 | 4 | 3 | 3 |

TABLE 1-continued

| | Type and concentration of acid | Type and concentration of colloidal silica | Type and concentration of water-soluble polymer | pH | Polishing rate | Surface roughness | Number of scratches | Slurry stability |
|---|---|---|---|---|---|---|---|---|
| | 1 mol/L | 5.9 mass % | | | | | | |
| Example 12 | A2<br>0.12 mol/L | B1<br>5.9 mass % | — | 1.1 | 5 | 3 | 3 | 3 |
| Example 13 | A3<br>0.12 mol/L | B1<br>5.9 mass % | — | 1.1 | 5 | 3 | 3 | 3 |
| Example 14 | A4<br>0.12 mol/L | B1<br>5.9 mass % | — | 1.5 | 5 | 3 | 3 | 3 |
| Example 15 | A5<br>0.12 mol/L | B1<br>5.9 mass % | — | 1.0 | 4 | 4 | 3 | 3 |

TABLE 2

| | Type and concentration of acid | Type and concentration of colloidal silica | Type and concentration of water-soluble polymer | pH | Polishing rate | Surface roughness | Number of scratches | Slurry stability |
|---|---|---|---|---|---|---|---|---|
| Comparative Example 1 | — | B1<br>5.9 mass % | — | 9.3 | 1 | 5 | 3 | 3 |
| Comparative Example 2 | A1<br>0.12 mol/L | — | — | 0.6 | 1 | 1 | 1 | 3 |
| Comparative Example 3 | A6<br>0.12 mol/L | B1<br>5.9 mass % | — | 0.9 | 5 | 2 | 3 | 3 |
| Comparative Example 4 | A7<br>0.12 mol/L | B1<br>5.9 mass % | — | 0.9 | 5 | 2 | 3 | 3 |
| Comparative Example 5 | A8<br>0.12 mol/L | B1<br>5.9 mass % | — | 1.0 | 5 | 1 | 3 | 3 |
| Comparative Example 6 | A9<br>0.12 mol/L | B1<br>5.9 mass % | — | 1.5 | 4 | 2 | 3 | 3 |
| Comparative Example 7 | A10<br>0.12 mol/L | B1<br>5.9 mass % | — | 1.3 | 5 | 1 | 3 | 3 |
| Comparative Example 8 | A10<br>0.12 mol/L | B1<br>5.9 mass % | C3<br>0.02 mass % | 1.3 | 5 | 2 | 3 | 3 |
| Comparative Example 9 | A11<br>0.12 mol/L | B1<br>5.9 mass % | — | 2.1 | 3 | 3 | 3 | 3 |
| Comparative Example 10 | A12<br>0.12 mol/L | B1<br>5.9 mass % | — | 3.5 | 3 | 4 | 3 | 3 |
| Comparative Example 11 | A13<br>0.12 mol/L | B1<br>5.9 mass % | — | 2.6 | 3 | 4 | 3 | 3 |
| Comparative Example 12 | A14<br>0.12 mol/L | B1<br>5.9 mass % | — | 2.7 | 3 | 3 | 3 | 3 |
| Comparative Example 13 | A15<br>0.12 mol/L | B1<br>5.9 mass % | — | 7.8 | 1 | 1 | 3 | 3 |
| Comparative Example 14 | A16<br>0.12 mol/L | B1<br>5.9 mass % | — | 1.1 | 4 | 1 | 3 | 3 |
| Comparative Example 15 | A17<br>0.12 mol/L | B1<br>5.9 mass % | — | 1.2 | 4 | 2 | 3 | 3 |
| Comparative Example 16 | A18<br>0.12 mol/L | B1<br>5.9 mass % | — | 9.2 | 1 | 5 | 3 | 3 |
| Comparative Example 17 | A19<br>0.12 mol/L | B1<br>5.9 mass % | — | 1.1 | 5 | 1 | 3 | 3 |
| Comparative Example 18 | A20<br>0.12 mol/L | B1<br>5.9 mass % | — | 8.6 | 1 | 1 | 3 | 2 |

TABLE 3

| |
|---|
| Polishing machine: double-sided polishing machine "9B-5P" manufactured by Speedfam Co., Ltd. |
| Polishing pad: polyurethane pad "FJM-01" manufactured by Filwil Co., Ltd. |
| Polishing pressure: 7.35 kPa |
| Rotational speed of upper platen: 13 rpm |
| Rotational speed of lower platen: 40 rpm |
| Feed rate of polishing composition: 50 mL/min |
| Polishing amount: 0.3 μm in a total thickness of both sides of the substrate |

As shown in Table 1, all the polishing compositions of Examples 1 to 15 were evaluated as being above the acceptable level with respect to all of the polishing rate, the surface roughness, the number of scratches, and the slurry stability. On the other hand, any of the polishing compositions of Comparative Examples 1 to 18 was not evaluated as being above the acceptable level with respect to at least either one of the polishing rate and the surface roughness, as shown in Table 2.

Examples 21 to 24 and Comparative Examples 21 to 24

In Examples 21 to 24, an acid and colloidal silica were mixed with water, optionally along with a pH adjuster, to prepare a polishing composition. In Comparative Examples 21 to 24, colloidal silica was mixed with water, optionally along with a pH adjuster, to prepare a polishing composition. Details of the acid, the colloidal silica, and the pH adjuster in the polishing composition of each Example and Comparative Example, and the results of the measurement of the pH of the polishing composition of each Example and Comparative Example are shown in Table 4.

In Table 4, A1 in the column entitled "Type and concentration of acid" represents isethionic acid; B4 in the column entitled "Type and concentration of colloidal silica" represents colloidal silica having an average primary particle size of 35 nm and an average secondary particle size of 66 nm; and C1 in the column entitled "pH adjuster" represents nitric acid, and C2 in the column entitled "pH adjuster" represents ammonia.

A small piece having a size of 60 mm×60 mm was cut from a silicon substrate having a diameter of 8 inches (about 200 mm) provided with a silicon dioxide film. The surface of the small piece was polished on the conditions shown in Table 5 using the polishing composition of each Example and Comparative Example. The polishing rate was determined based on the difference of the film thickness on the small piece of the substrate before and after polishing. The results are shown in the column entitled "Polishing rate" in Table 4.

TABLE 4

| | Type and concentration of acid | Type and concentration of colloidal silica | pH adjuster | pH | Polishing rate [Å/min] |
|---|---|---|---|---|---|
| Example 21 | A1 0.15 mol/L | B4 7 mass % | C2 | 3 | 798 |
| Example 22 | A1 0.15 mol/L | B4 7 mass % | C2 | 7 | 112 |
| Example 23 | A1 0.15 mol/L | B4 7 mass % | C2 | 9 | 180 |
| Example 24 | A1 0.15 mol/L | B4 7 mass % | C2 | 10 | 112 |
| Comparative Example 21 | — | B4 7 mass % | C1 | 3 | 447 |
| Comparative Example 22 | — | B4 7 mass % | — | 7 | 33 |
| Comparative Example 23 | — | B4 7 mass % | C2 | 9 | 26 |
| Comparative Example 24 | — | B4 7 mass % | C2 | 10 | 58 |

TABLE 5

Polishing machine: single-sided polishing machine "EJ-3801N" manufactured by Engis Japan Corporation
Polishing pad: polyurethane "IC-1010" manufactured by Rohm and Haas Japan K.K.
Polishing pressure: 19 kPa
Rotational speed of platen: 60 rpm

TABLE 5-continued

Feed rate of polishing composition: 100 mL/min
Polishing time: 60 seconds

As shown in Table 3, it was verified that the polishing compositions of Examples 21 to 24 had a significantly higher polishing rate than the polishing compositions of Comparative Examples 21 to 24.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A polishing composition comprising abrasive grains, a water-soluble polymer, and an acid represented either by the general formula (1):

$$R^2—R^1—SO_3H$$

where $R^1$ is a linear alkylene or hydroxyalkylene group having 1 to 4 carbon atoms, and $R^2$ is a hydroxy group, a carboxy group, or a sulfonic acid group when $R^1$ is the linear alkylene group, or $R^2$ is a carboxy group or a hydroxymethyl group when $R^1$ is the linear hydroxyalkylene group, or by the general formula (2):

$$C_6H_5—R^3$$

where $R^3$ is a sulfonic acid group or a phosphonic acid group.

2. The polishing composition according to claim 1, wherein the acid is isethionic acid.

3. The polishing composition according to claim 1, wherein the acid is benzenesulfonic acid.

4. A polishing method for polishing a silicon oxide material using a polishing composition, the polishing composition containing abrasive grains, a water-soluble polymer, and an acid represented either by the general formula (1):

$$R^2—R^1—SO_3H$$

where $R^1$ is a linear alkylene or hydroxyalkylene group having 1 to 4 carbon atoms, and $R^2$ is a hydroxy group, a carboxy group, or a sulfonic acid group when $R^1$ is the linear alkylene group, or $R^2$ is a carboxy group or a hydroxymethyl group when $R^1$ is the linear hydroxyalkylene group, or by the general formula (2):

$$C_6H_5—R^3$$

where $R^3$ is a sulfonic acid group or a phosphonic acid group.

5. The polishing composition according to claim 1, wherein the water-soluble polymer is selected from the group consisting of a polystyrene sulfonate, a polyacrylate, and a polyvinyl acetate.

6. The polishing composition according to claim 1, wherein the water-soluble polymer is a polystyrene sulfonate having a weight average molecular weight of 1,000 to 5,000,000.

7. The polishing composition according to claim 1, wherein the water-soluble polymer is sodium polystyrene sulfonate.

* * * * *